Patented Dec. 2, 1947

2,432,064

UNITED STATES PATENT OFFICE 2,432,064

PURIFICATION OF QUINALDINE

Francis E. Cislak and Merritt M. Otto, Indianapolis, Ind., assignors to Reilly Tar & Chemical Corporation, Indianapolis, Ind., a corporation of Indiana No Drawing. Application October 20, 1943, Serial No. 507,018

8 Claims. (Cl. 260—283)

Our invention relates to the purification of quinaldine (2-methylquinoline).

It is the object of our present invention to obtain a purified quinaldine; and to obtain new compounds of quinaldine with a mononuclear tar acid having at least one of its meta positions unsubstituted.

Quinaldine, associated with various other basic nitrogen bodies, is obtained in the processing of coal tar. Most of the other basic nitrogen bodies commonly present can be quite readily and fairly completely separated from the quinaldine by fractional distillation. But the boiling points of other methylquinolines, especially 8-methylquinoline, and of isoquinoline and 3-methylisoquinoline, are so close to that of quinaldine that it is not commercially practical to separate the quinaldine from them by fractional distillation.

We have found that by treating crude quinaldine, containing isoquinoline, whether or not the crude quinaldine also contains small amounts of higher and/or lower related basic nitrogen bodies (such as quinoline and the methylquinolines) with a mononuclear tar acid having at least one of its meta positions unsubstituted, and cooling to get a formation of crystals of a compound of tar acid with quinaldine, an addition product of some character composed of one molecule of quinaldine and one molecule of said tar acid. The cooling is desirably to a temperature of about 0° C., but for most of the mononuclear tar acids used need not be below about 15° C. These crystals can readily be recovered, as by decanting or filtering, and can readily be reconverted into substantially pure quinaldine and substantially pure mononuclear tar acid, as by fractional distillation or by treatment with dilute aqueous caustic soda solution.

The mononuclear tar acids which we have found suitable for carrying out our invention are characterized by having no substituent, other than hydrogen, in at least one of the positions meta to the hydroxyl group, and include phenol, o-cresol, m-cresol, p-cresol, 1,3,4-xylenol, and 1,2,4-xylenol.

The compounds of tar acid with quinaldine, recovered as aforesaid, are new compounds. The approximate melting points of these compounds of tar acid with quinaldine are given below:

| Compound | Melting Point |
|---|---|
| | °C. |
| phenol-quinaldine | 45 |
| orthocresol-quinaldine | 75 |
| metacresol-quinaldine | 20 |
| paracresol-quinaldine | 34 |
| 1,3,4-xylenol-quinaldine | 27 |
| 1,2,4-xylenol-quinaldine | 51 |

These compounds are of interest in the preparation of disinfectants and insecticides, as well as in the present process of purifying quinaldine.

The paracresol-quinaldine compound, while it is included under certain broad claims of the present application, is claimed specifically in our co-pending application Serial No. 507,017, filed of even date herewith.

The following examples illustrate our invention:

Example 1.—One hundred fifty pounds of crude quinaldine (containing 50%–70% quinaldine) is thoroughly mixed with about 90–100 pounds of orthocresol. With these proportions there is a molecular excess of crude quinaldine; which we deem desirable although it is not essential. When the mixing is completed the mixture is cooled to about 10° C. to 25° C. By such cooling the addition product, orthocresol-quinaldine, usually crystallizes spontaneously from the mixture; although sometimes it is necessary to start crystallization by seeding with crystals of orthocresol-quinaldine. The crystals of orthocresol-quinaldine produced by the cooling are suitably separated, most conveniently by filtration or centrifugation. These crystals are subjected to fractional distillation, which decomposes them into orthocresol and quinaldine, whereupon the orthocresol distills over first, and then at a much higher temperature the quinaldine distills over. As so recovered, the quinaldine is usually of about 90% purity. The quinaldine thus obtained is sufficiently pure for many uses. If greater purity of the quinaldine is desired, however, it is readily obtained by purification of the orthocresol-quinaldine from which it was obtained. Conveniently such purification consists in recrystallizing the orthocresol-quinaldine from toluene or petroleum thinner, and separating the purified crystals of orthocresol-quinaldine from the mother liquor. Upon subjecting these purified crystals to fractional distillation, in the same manner as described before, a quinaldine of 95–98% purity is obtained.

Example 2.—The procedure of Example 1 is repeated, save that in place of 90–100 pounds of orthocresol we use 80–90 pounds of phenol.

Example 3.—The procedure of Example 1 is repeated, save that in place of 90–100 pounds of orthocresol we use 100–110 pounds of 1,2,4-xylenol.

In place of the tar acids used in the foregoing examples we can use other mononuclear tar acids which have at least one unsubstituted meta position, such as metacresol, paracresol, and 1,3,4-xylenol. When using these latter tar acids, however, it is desirable to cool the mixture of tar acid and crude quinaldine to about 5° C. to 15° C. in order to cause crystallization of the addition compound of tar acid with quinaldine.

The obtaining of the quinaldine by fractional distillation from the compound of tar acid with quinaldine, as above described, is our preferred way of obtaining it; but we can obtain it from the tar acid-quinaldine in other ways. For example, we can treat the compound of tar acid with quinaldine with an aqueous caustic soda solution of between 10% and 50% concentration. This decomposes the compound of tar acid with quinaldine to yield an upper layer of quinaldine, and a lower layer of tar acid dissolved in aqueous caustic soda. The quinaldine is suitably separated from the caustic soda solution of tar acid, as by decantation.

If desired, we can use a refined quinaldine in place of the crude quinaldine; and this is sometimes very desirable when the object is to obtain merely a compound of tar acid with quinaldine.

We claim as our invention:

1. The process of purifying quinaldine, which consists in mixing the crude quinaldine with a mononuclear tar acid having a hydrogen in at least one of its meta positions, and producing in the resulting mixture a sufficiently low temperature to form crystals of a compound of tar acid with quinaldine, separating such crystals, and chemically decomposing said crystals to liberate quinaldine in purified form.

2. The process of purifying quinaldine as set forth in claim 1, in which the tar acid is orthocresol.

3. The process of purifying quinaldine as set forth in claim 1, in which the tar acid is phenol.

4. The process of purifying quinaldine as set forth in claim 1, in which the tar acid is 1,2,4-xylenol.

5. The process of obtaining a compound of quinaldine with a tar acid having a hydrogen in at least one of its meta positions, which consists in mixing the tar acid with quinaldine, producing in the resulting mixture a sufficiently low temperature to form crystals of a compound of tar acid with quinaldine, and recovering said crystals.

6. The process of obtaining orthocresol-quinaldine, which consists in mixing orthocresol and quinaldine, producing in the resulting mixture a sufficiently low temperature to form crystals of orthocresol-quinaldine, and recovering said crystals.

7. The process of obtaining phenol-quinaldine, which consists in mixing phenol and quinaldine, producing in the resulting mixture a sufficiently low temperature to form crystals of phenol-quinaldine, and recovering said crystals.

8. The process of obtaining 1,2,4-xylenol-quinaldine, which consists in mixing 1,2,4-xylenol and quinaldine, producing in the resulting mixture a sufficiently low temperature to form crystals of 1,2 4-xylenol-quinaldine, and recovering said crystals.

FRANCIS E. CISLAK.
MERRITT M. OTTO.

REFERENCES CITED

The following references are of record in the file of this patent:

UNITED STATES PATENTS

| Number | Name | Date |
|---|---|---|
| 1,795,382 | Ulrich | Mar. 10, 1931 |
| 1,980,901 | Bentley | Nov. 13, 1934 |
| 2,193,336 | Lecher | Mar. 12, 1940 |
| 2,272,498 | Zerweek et al. | Feb. 10, 1942 |
| 2,310,616 | Cislak et al. | Feb. 9, 1943 |

OTHER REFERENCES

Chem. Abstracts, 1916, page 1955.
Chem. Abstracts, 1938, page 1165.
Chem. Abstracts, 1943, page 375.
Biochemische Zeitschrift, vol. 286, page 232.
Archiv fur exper. Path. und Pharm.; vol. 174, page 255.
Archiv fur exper. Path. und Pharm.; vol. 175, page 372.